United States Patent [19]
Hsu et al.

[11] Patent Number: 5,974,176
[45] Date of Patent: *Oct. 26, 1999

[54] AUTOMATIC MATCHING DEVICE FOR PLANAR POINT PATTERNS AND METHOD THEREOF

[75] Inventors: Wen-Hsing Hsu, 3F, 54 Park Ave. II, Science Based Industrial Park; Shih-Hsu Chang, both of Hsinchu, Taiwan

[73] Assignee: Wen-Hsing Hsu, Hsinchu, Taiwan

[ * ] Notice: This patent is subject to a terminal disclaimer.

[21] Appl. No.: 08/756,523

[22] Filed: Nov. 26, 1996

[51] Int. Cl.⁶ ................................................ G06K 9/46
[52] U.S. Cl. ................................. 382/201; 382/219
[58] Field of Search ............................ 382/201, 228, 382/124, 205, 219

[56] References Cited

U.S. PATENT DOCUMENTS 5,392,367  2/1995  Hsu et al. ............................. 382/228

Primary Examiner—Jose L. Couso
Assistant Examiner—Anh Hong Do
Attorney, Agent, or Firm—Bacon & Thomas, PLLC

[57] ABSTRACT

A method for automatic matching of planar point patterns in a reference pattern with a test pattern includes course mating, calculation of a mated possibility for one point in each pattern using fuzzy relaxation, preliminary selection of mated pairs based on these possibilities, and calculation of a similarity value based upon the number of mated pairs, the mated rate of the reference and test patterns, and the average mating possibility and average distance between mated points.

16 Claims, 9 Drawing Sheets

| Pattern A | | |
|---|---|---|
| | X-coordinate | Y-coordinate | Feature Direction |
| 1 | 24 | 48 | 0 |
| 2 | 48 | 48 | 23 |
| 3 | 72 | 48 | 45 |
| 4 | 96 | 48 | 68 |
| 5 | 24 | 88 | 90 |
| 6 | 48 | 88 | 113 |
| 7 | 72 | 88 | 135 |
| 8 | 96 | 88 | 158 |
FIG. 3(a)
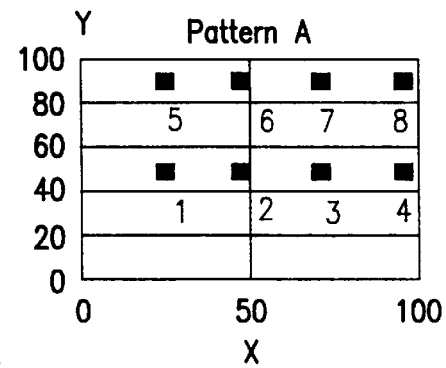
FIG. 3(b)
| Pattern B | | |
|---|---|---|
| | X-coordinate | Y-coordinate | Feature Direction |
| 1 | 33 | 36 | 20 |
| 2 | 55 | 45 | 43 |
| 3 | 76 | 53 | 65 |
| 4 | 100 | 64 | 88 |
| 5 | 21 | 74 | 110 |
| 6 | 41 | 79 | 133 |
| 7 | 64 | 90 | 155 |
| 8 | 86 | 99 | 178 |
FIG. 4(a)
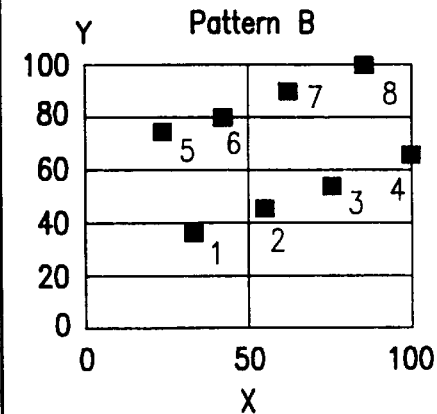
FIG. 4(b)
| Pattern C | | |
|---|---|---|
| | X-coordinate | Y-coordinate | Feature Direction |
| 1 | 16 | 40 | 0 |
| 2 | 16 | 80 | 20 |
| 3 | 48 | 40 | 40 |
| 4 | 48 | 80 | 60 |
| 5 | 88 | 40 | 90 |
| 6 | 88 | 80 | 110 |
| 7 | 120 | 40 | 140 |
| 8 | 120 | 80 | 160 |
FIG. 5(a)
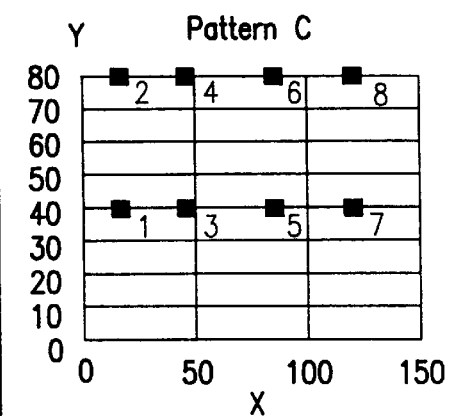
FIG. 5(b)

|    | a1 | a2 | a3 | a4 | a5 | a6 | a7 | a8 |
|----|----|----|----|----|----|----|----|----|
| b1 | 1  | 1  | 1  | 0  | 0  | 0  | 0  | 0  |
| b2 | 1  | 1  | 1  | 1  | 0  | 0  | 0  | 0  |
| b3 | 0  | 1  | 1  | 1  | 0  | 0  | 0  | 0  |
| b4 | 0  | 0  | 1  | 1  | 0  | 0  | 0  | 0  |
| b5 | 0  | 0  | 0  | 0  | 1  | 1  | 0  | 0  |
| b6 | 0  | 0  | 0  | 0  | 1  | 1  | 1  | 0  |
| b7 | 0  | 0  | 0  | 0  | 0  | 1  | 1  | 1  |
| b8 | 0  | 0  | 0  | 0  | 0  | 0  | 1  | 1  |

FIG. 6

|    | a1 | a2 | a3 | a4 | a5 | a6 | a7 | a8 |
|----|----|----|----|----|----|----|----|----|
| c1 | 1  | 1  | 0  | 0  | 0  | 0  | 0  | 0  |
| c2 | 1  | 1  | 0  | 0  | 0  | 0  | 0  | 0  |
| c3 | 1  | 1  | 1  | 1  | 0  | 0  | 0  | 0  |
| c4 | 0  | 1  | 1  | 1  | 1  | 0  | 0  | 0  |
| c5 | 0  | 0  | 1  | 1  | 0  | 1  | 1  | 0  |
| c6 | 0  | 0  | 0  | 1  | 0  | 1  | 1  | 0  |
| c7 | 0  | 0  | 0  | 0  | 0  | 0  | 1  | 1  |
| c8 | 0  | 0  | 0  | 0  | 0  | 0  | 1  | 1  |

FIG. 7

|    | a2    | a3    | a4    | a5    | a6    | a7    | a8    |
|----|-------|-------|-------|-------|-------|-------|-------|
| b2 | 0.933 | 0.500 | 0.500 | 0.000 | 0.000 | 0.000 | 0.000 |
| b3 | 0.500 | 0.900 | 0.500 | 0.000 | 0.000 | 0.000 | 0.000 |
| b4 | 0.000 | 0.500 | 0.978 | 0.000 | 0.000 | 0.000 | 0.000 |
| b5 | 0.000 | 0.000 | 0.000 | 0.923 | 0.570 | 0.000 | 0.000 |
| b6 | 0.000 | 0.000 | 0.000 | 0.636 | 0.870 | 0.500 | 0.000 |
| b7 | 0.000 | 0.000 | 0.000 | 0.000 | 0.500 | 0.989 | 0.500 |
| b8 | 0.000 | 0.000 | 0.000 | 0.000 | 0.000 | 0.500 | 1.000 |

FIG. 8

|    | a1    | a2    | a3    | a4    | a5    | a6    | a7    | a8    |
|----|-------|-------|-------|-------|-------|-------|-------|-------|
| b1 | 0.714 | 0.499 | 0.448 | 0.000 | 0.000 | 0.000 | 0.000 | 0.000 |
| b2 | 0.502 | 0.670 | 0.480 | 0.451 | 0.000 | 0.000 | 0.000 | 0.000 |
| b3 | 0.000 | 0.467 | 0.617 | 0.496 | 0.000 | 0.000 | 0.000 | 0.000 |
| b4 | 0.000 | 0.000 | 0.471 | 0.601 | 0.000 | 0.000 | 0.000 | 0.000 |
| b5 | 0.000 | 0.000 | 0.000 | 0.000 | 0.567 | 0.482 | 0.000 | 0.000 |
| b6 | 0.000 | 0.000 | 0.000 | 0.000 | 0.497 | 0.547 | 0.473 | 0.000 |
| b7 | 0.000 | 0.000 | 0.000 | 0.000 | 0.000 | 0.477 | 0.547 | 0.523 |
| b8 | 0.000 | 0.000 | 0.000 | 0.000 | 0.000 | 0.000 | 0.477 | 0.529 |

FIG. 9

|    | a1    | a2    | a3    | a4    | a5    | a6    | a7    | a8    |
|----|-------|-------|-------|-------|-------|-------|-------|-------|
| c1 | 0.360 | 0.319 | 0.000 | 0.000 | 0.000 | 0.000 | 0.000 | 0.000 |
| c2 | 0.327 | 0.321 | 0.000 | 0.000 | 0.000 | 0.000 | 0.000 | 0.000 |
| c3 | 0.364 | 0.354 | 0.326 | 0.312 | 0.000 | 0.000 | 0.000 | 0.000 |
| c4 | 0.000 | 0.324 | 0.338 | 0.311 | 0.378 | 0.000 | 0.000 | 0.000 |
| c5 | 0.000 | 0.000 | 0.343 | 0.370 | 0.000 | 0.335 | 0.321 | 0.000 |
| c6 | 0.000 | 0.000 | 0.000 | 0.332 | 0.000 | 0.335 | 0.350 | 0.000 |
| c7 | 0.000 | 0.000 | 0.000 | 0.000 | 0.000 | 0.000 | 0.327 | 0.317 |
| c8 | 0.000 | 0.000 | 0.000 | 0.000 | 0.000 | 0.000 | 0.320 | 0.383 |

FIG. 10

|    | a1    | a2    | a3    | a4    | a5    | a6    | a7    | a8    |
|----|-------|-------|-------|-------|-------|-------|-------|-------|
| b1 | 0.714 | 0     | 0     | 0     | 0     | 0     | 0     | 0     |
| b2 | 0     | 0.670 | 0     | 0     | 0     | 0     | 0     | 0     |
| b3 | 0     | 0     | 0.617 | 0     | 0     | 0     | 0     | 0     |
| b4 | 0     | 0     | 0     | 0.601 | 0     | 0     | 0     | 0     |
| b5 | 0     | 0     | 0     | 0     | 0.567 | 0     | 0     | 0     |
| b6 | 0     | 0     | 0     | 0     | 0     | 0.547 | 0     | 0     |
| b7 | 0     | 0     | 0     | 0     | 0     | 0     | 0.547 | 0     |
| b8 | 0     | 0     | 0     | 0     | 0     | 0     | 0     | 0.529 |

FIG. 11

|    | a1    | a2    | a3 | a4    | a5    | a6 | a7    | a8    |
|----|-------|-------|----|-------|-------|----|-------|-------|
| c1 | 0     | 0     | 0  | 0     | 0     | 0  | 0     | 0     |
| c2 | 0     | 0.321 | 0  | 0     | 0     | 0  | 0     | 0     |
| c3 | 0.364 | 0     | 0  | 0     | 0     | 0  | 0     | 0     |
| c4 | 0     | 0     | 0  | 0     | 0.378 | 0  | 0     | 0     |
| c5 | 0     | 0     | 0  | 0.370 | 0     | 0  | 0     | 0     |
| c6 | 0     | 0     | 0  | 0     | 0     | 0  | 0.350 | 0     |
| c7 | 0     | 0     | 0  | 0     | 0     | 0  | 0     | 0     |
| c8 | 0     | 0     | 0  | 0     | 0     | 0  | 0     | 0.383 |

| Pattern B | | After Transf'n | | Mated Points in A | | Difference in Distance |
|---|---|---|---|---|---|---|
| X | Y | X | Y | X | Y | |
| 33 | 36 | 24.35 | 48.16 | 24 | 48 | 0.15 |
| 55 | 45 | 48.12 | 48.05 | 48 | 48 | 0.02 |
| 76 | 53 | 70.58 | 47.4 | 72 | 48 | 2.38 |
| 100 | 64 | 96.96 | 48.38 | 96 | 48 | 1.07 |
| 21 | 74 | 27.81 | 87.86 | 24 | 88 | 14.52 |
| 64 | 90 | 73.66 | 86.18 | 72 | 88 | 6.06 |
| 41 | 79 | 48.2 | 84.82 | 48 | 88 | 10.13 |
| 86 | 99 | 97.43 | 86.07 | 96 | 88 | 5.75 |

FIG. 14

| Pattern B | | After Transf'n | | Mated Points in A | | Difference in Distance |
|---|---|---|---|---|---|---|
| X | Y | X | Y | X | Y | |
| 33 | 36 | 23.88 | 48.26 | 24 | 48 | 0.08 |
| 55 | 45 | 47.65 | 48.66 | 48 | 48 | 0.57 |
| 76 | 53 | 70.12 | 48.5 | 72 | 48 | 3.8 |
| 100 | 64 | 96.47 | 50.05 | 96 | 48 | 4.42 |
| 21 | 74 | 26.48 | 88.02 | 24 | 88 | 6.15 |
| 64 | 90 | 72.35 | 87.34 | 72 | 88 | 0.57 |
| 41 | 79 | 46.93 | 85.43 | 48 | 88 | 7.76 |
| 86 | 99 | 96.12 | 87.74 | 96 | 88 | 0.08 |

FIG. 15

| Pattern B | | After Transf'n | | Mated Points in A | | Difference in Distance |
|---|---|---|---|---|---|---|
| X | Y | X | Y | X | Y | |
| 120 | 80 | 101.46 | 92.84 | 96 | 88 | 53.24 |
| 48 | 80 | 29.92 | 84.71 | 24 | 88 | 45.88 |
| 88 | 40 | 74.18 | 49.48 | 96 | 48 | 478.25 |
| 48 | 40 | 34.44 | 44.97 | 24 | 48 | 118.14 |
| 88 | 80 | 69.67 | 89.23 | 72 | 88 | 6.96 |
| 16 | 80 | -1.87 | 81.1 | 48 | 48 | 3582.91 |

FIG. 16

| Pattern B | | After Transf'n | | Mated Points in A | | Difference in Distance |
|---|---|---|---|---|---|---|
| X | Y | X | Y | X | Y | |
| 120 | 80 | 98.16 | 87.29 | 96 | 88 | 5.16 |
| 48 | 80 | 26.17 | 88.45 | 24 | 88 | 4.89 |
| 48 | 40 | 25.52 | 48.46 | 24 | 48 | 2.51 |
| 88 | 80 | 66.16 | 87.8 | 72 | 88 | 34.14 |

| No. of Fingerprints | Method | FRR at FAR=1% | FRR at FAR=0.1% | FRR at FAR=0.01% | FRR at FAR=0.001% |
|---|---|---|---|---|---|
| 800 | This Invention | 7.75% | 10.41% | 16.46% | 20.97% |
| 800 | 79109743 | 17.48% | 25.48% | 38.00% | 43.17% |

AUTOMATIC MATCHING DEVICE FOR PLANAR POINT PATTERNS AND METHOD THEREOF

FIELD OF INVENTION

The present invention relates to an automatic matching device and method for planar point patterns, especially to an automatic matching system for patterns consisting of points which are distributed in a planar wherein the patterns could have been shifted, rotated or distorted.

BACKGROUND OF INVENTION

The matching of two or more planar point patterns is an important technique in the field of computer vision technology and in the image processing technology. When an image is input into a computer in a digitized format, the "feature points" of the image can be abstracted with the conventional feature abstracting technologies, according to the characters of the image or to the purposes of the processing. The feature points, more concretely, the coordinates of the points, so obtained can be used in the recognition of the image. For example, by matching the distribution of the feature points, the similarity of the patterns comprising the feature points can be calculated, so that the similarity of the images can be decided.

A good example of the application of the pattern matching technology is the recognition of fingerprints. When the image of a fingerprint is scanned by an image scanner, the image is digitized and input to a computer. The computer uses a software to abstract the distribution of the feature points of the fingerprint, usually the terminals and the cross points of the lines of the fingerprint. By matching two patterns comprising feature points obtained in different time or places, whether the two fingerprints came from the same finger, can be decided.

In the matching of two planar point patterns so obtained, several problems will be faced. One is, the number of feature points of two patterns could be different, even if they were abstracted from a same image or image source. Another is, the possibility that the same feature point exists at the same position in both patterns can not be forecast. The third is, while the images (patterns) were obtained at different time and/or places, the distribution of the feature points in one pattern could be shifted, rotated and/or distorted (enlarged or reduced), if compared with the other pattern.

Taiwan patent application No. 79109743 (corresponding to U.S. Pat. No. 5,392,367) related to a "Planar Pattern Point Matching and Recognition Method and Device thereof" wherein a "fuzzy relaxation" approach is introduced.

According to said patent, the matching of two planar point patterns are conducted in two steps. The first step is to mate the points of one pattern (the reference pattern) with the points of another pattern (the test pattern). The second step is to calculate the similarity of the two patterns.

In the mating process, a "course matching" approach is used to exclude pairs of points that are impossible to be mated. The "mating possibility" of one point from the reference pattern to be mated with one point from the test pattern is set at 0 for those pairs that can not be mated and is set at 1 for other pairs. The mating possibility of a pair is then adjusted according to "the value of other mated pairs to support such mating, given that such one pair is mated". The mating possibility of one mated pair is calculated to the following equation:

$$S^{(r)}(pi, qj) = \frac{\sum_{h \neq i, k \neq j} \{\max[S^{(r-1)}(pi, qj) \times Cij(h, k)]\}}{m - 1},$$

wherein $S^{(r)}(pi,qj)$ represents the mating possibility of points pi and qj, when it is adjusted for the $r^{th}$ time, pi represents a point from the test pattern P, qj represent a point from the reference pattern Q, $Cij(h, k)$ represents the value that another mated pair ph and qk to support the mating of pi and qj wherein $$Cij(h, k) = \frac{1}{1 + \Delta}, \Delta = \frac{|l_{ih} - l_{jk}|}{|l_{ih} + l_{jk}|},$$

l's represent distances between pi and ph or between qj and qk and m represents the least number of points in patterns P and Q.

While the mating possibility of every point from the reference pattern with every point from the test pattern is calculated, the best mated pairs can be selected with a "sequential forward selection method".

In the second step, the similarity of the reference pattern and the test pattern can be calculated employing the following components. They are: the mated rate (number of mated pairs/minimum number of points of the two patterns), the average mating possibility, the average distance of mated pairs and the scaling factor.

In order to solve the problem of distortion, including shift, rotation and proportional scaling, a "least mean-square-error" value was introduced to adjust the distribution of the test pattern.

Although the above-said patent taught an automatic matching method for planar point patterns with high efficiency, it inherits the problem of relatively high rejection rate. If the "false acceptance rate—FAR" is set at 0.1%, in matching 800 fingerprint images, its "false rejection rate—FRR" will be about 25%. This means, when two images are from the same fingerprint, the possibility that the system decides they are not from the same fingerprint is 25%.

It is then necessary to develop an automatic matching device and method for planar point patterns wherein the FRR can be reduced. It is also necessary to have an automatic matching device and method that provide higher efficiency.

OBJECTS OF THE INVENTION

The object of this invention is to provide an automatic matching method that can match patterns of points which distribute in a plan, in a way that the number of points can be different, that the distribution of the points can not be forecast and that the patterns can be distorted.

Another object of this invention is to provide an automatic matching method for planar point patterns with lower false rejection rate.

Another object of this invention is to provide a method to automatically match at least two planar point patterns with high speed.

Another purpose of this invention is to provide an automatic matching device for planar point patterns that has the above-said advantages.

SUMMARY OF THE INVENTION

According to this invention, an automatic matching method for planar point patterns is disclosed. The matching process of this invention comprises:

1. Coarse mating: Minimum requirements for one point from the reference pattern to be mated with one point from the test pattern are introduced. If the relation of one point from one pattern and one point from the other pattern does not satisfy anyone of the requirements, they are decided not a mated pair.
2. Calculation of mating possibility: A new algorithm for the "fuzzy relaxation" approach is introduced, as follows:

$$S^{(r)}(pi, qj) = \frac{1}{m-1} \sum_{\substack{h=i \\ h \neq i}}^{m} \left\{ \max_{\substack{k=j \\ k \neq j}}^{n} [S^{(r-1)}(pi, qj) \times Cij(h, k)] \right\}$$

wherein pi represents a point from the test pattern P, qj represents a point from the reference pattern Q, $S^{(r)}$(pi, qj) represents the mating possibility of points pi and qj when it is adjusted for the $r^{th}$ time wherein $S^{(0)}$(pi, qj) is 0 or 1 (to be described in details), m represents the least number of points in patterns P and Q, and Cij(h, k) represents the value that another mated pair consisting points ph and qk to support the mating of pi and qj. Selection of mated pairs: Best mated pairs of points from both patterns are selected according to the mating possibilities of the pairs.
1. Calculation of the similarity of the patterns: The similarity of the patterns is calculated according to: number of mated pairs, mated rate of the reference pattern, mated rate of the test pattern, average mating possibility and average square root of distance of the mated pairs.

In addition, a device employing the matching method is also disclosed in the invention.

The above and other purposes and advantages of the invention can be fully understood from the detailed description by referring to the following drawings.

BRIEF DESCRIPTION OF THE DRAWINGS

FIGS. 3(*a*), 3(*b*), 4(*a*), 4(*b*), 5(*a*), and 5(*b*) illustrate three patterns (Pattern A (FIG. 3(*b*)), Pattern B (FIG. 4(*b*)) and Pattern C FIG. 5(*b*)) consisting of 8 planar points.

FIG. 6 illustrates the results of the coarse mating of Patterns B and A.

FIG. 7 illustrates the results of coarse mating of Patterns C and A.

FIG. 8 illustrates the mated possibilities of pairs of points other than a1 and b1, supposing a1 of Pattern A and b1 of Pattern B are mated.

FIG. 9 illustrates the mated possibilities of every point in Pattern A and every point in Pattern B, after two times of adjustments.

FIG. 10 illustrates the mated possibilities of every point in Pattern A and every point in Pattern C, after two times of adjustments.

FIG. 11 illustrates the results of the preliminary selection of Patterns B and A.

FIG. 12 illustrates the results of the preliminary selection of Patterns C and A.

FIG. 13 illustrates the coordinates of Pattern B after the transformation and the distance between the mated points.

FIG. 14 illustrates the coordinates of Pattern B after the second transformation and the distance between the mated points.

FIG. 15 illustrates the coordinations of Pattern C after the transformation and the distance between the mated points.

FIG. 16 illustrates the coordinates of Pattern C after the second transformation and the distance between the mated points.

DETAILED DESCRIPTION OF THE INVENTION

Figure 1:
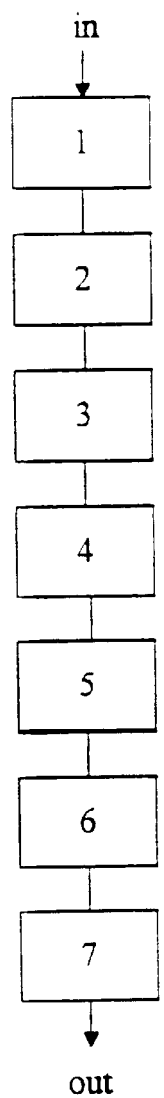
FIG. 1 illustrates the schematic diagram of the automatic matching device for planar point patterns of this invention.

The following is a detailed description of the embodiment of the present invention.

Given two patterns consisting of points distributed in a plan (planar point patterns) P and Q where:

P={p1, p2, p3, . . . , pm} is the test pattern consisting of m points and

Q={q1, q2, q3, . . . , qn} is the reference pattern consisting of n points;

wherein the points are expressed as (x, y, D) in which (x, y) represents the coordinate of the point and D represent its feature direction.

In the application of this invention, the patterns always represent feature points abstracted from images. For example, the image can be a fingerprint and the feature points represent the terminal points or the cross points of the lines of the fingerprint. The image can also be a hand-written character. In this case the feature points are the end points and the cross points of the character. In other application the feature points can represent other features of an image. Usually the feature points are connected or related to a certain lines or curve lines. The "feature direction" is thus defined as:

1. When a point is the terminal point of a line or curve line, the feature direction D represents the tangent direction of the line; and
2. When a point is the cross point of two or more lines or curve lines, the feature direction D represents the bisector direction of the acute formed by the lines.

The unit of the feature direction is angle where 0 angle is the positive horizontal direction and the positive direction is the clockwise direction.

In general cases, pattern P shall be rotated aθ angle and shifted along the x axis and y axis at distances (tx, ty) so that most points in pattern P can be matched or overlapped with points in pattern Q. We can thus use the function (tx, ty, θ) to describe the matching relation of the patterns. In other words, when the matching is ideal, a function (tx, ty, θ) can be found where pattern P is rotated a θ angle and shifted at distances (tx, ty) so that maximum number of points in pattern P can be matched with points in pattern Q.

Under such definition, suppose point pi of the test pattern P is mated with point qj of the reference pattern Q, such mating shall satisfy the following equations:

$$x_{qj}=tx+x_{pi} \cos \theta - y_{pi} \sin \theta \quad (1)$$

$$y_{qj}=ty+x_{pi} \sin \theta + y_{pi} \cos \theta \quad (2)$$

$$Dqj=(Dpi+Dr)+\theta \quad (3)$$

wherein xpi and ypi represent the coordinate of point pi, xqj and yqj represent the coordinate of point qj, Dpi and Dqj represent the feature directions of pi and qj respectively, tx and ty represent the shift distance between the patterns along x axis and y axis and Dr represents a distortion difference.

Here, the distortion difference is defined as: the difference between the feature directions of the points of a mated pair after the test pattern is rotated a θ angle. In ideal cases, while the test pattern is rotated a θ angle, the feature direction of the points of a mated pair should be same. This, however, does not always happen, since a certain amount of distortion can be found in the abstraction of the feature points. Dr is introduced to represent the distortion and is expressed by degrees.

The following is a description of the device and method of automatic matching for planar point patterns of this invention. FIG. 1 illustrates the schematic diagram of the automatic matching device for planar point patterns of this invention. As shown in the figure, the automatic matching device for planar point patterns of this invention comprises: a sampling means 1, a coarse mating means 2, amated possibility calculation means 3, a selection means 4, an adjustment means 5, a similarity calculation means 6 and a determination means 7.

Figure 2:
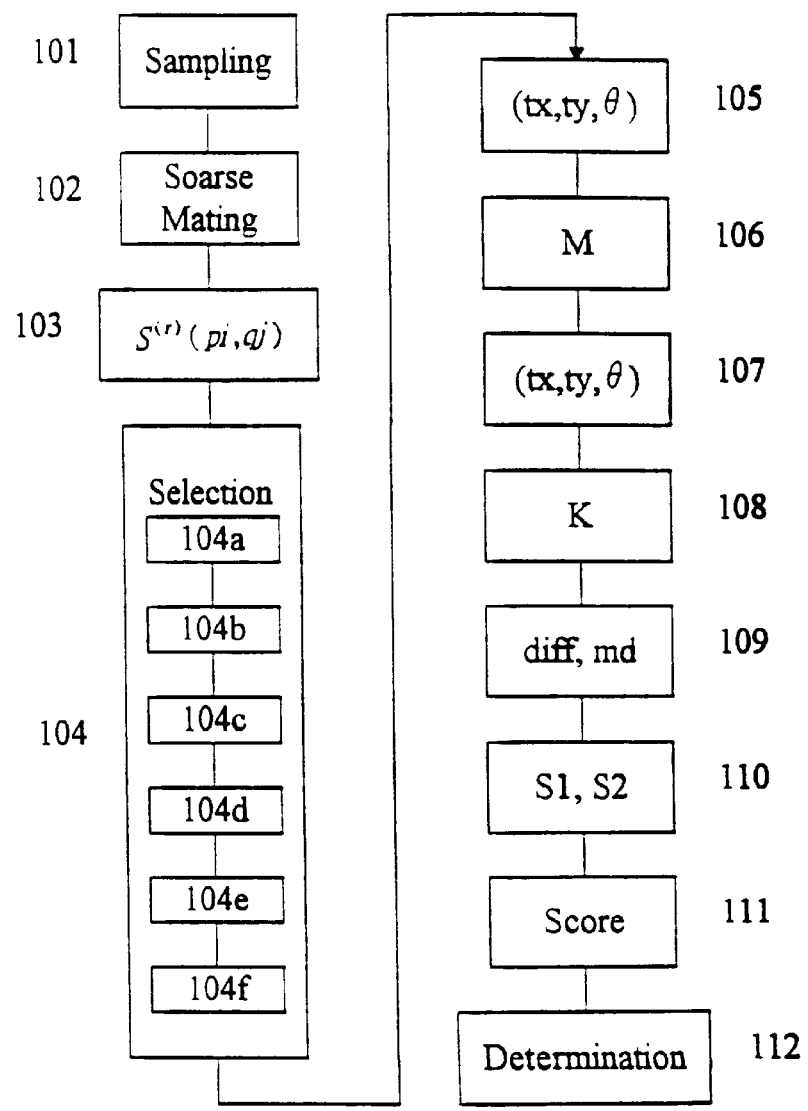
FIG. 2 illustrates the flow chart of the method of automatic matching for planar point patterns of this invention.

FIG. 2 illustrates the flow chart of the method of automatic matching for planar point patterns of this invention. A detailed description to the method and device of this invention will be given by referring to the figures.

As shown in FIG. 2, in the beginning, at 101 the sampling means 1 obtains data of two planar point patterns P and Q. The data include the coordinates and the feature directions of the points. The two patterns are subject to matching using the method and device of this invention.

COARSE MATING

At 102 the coarse mating means 2 proceed the coarse mating of the two patterns P and Q. The purpose of the coarse mating is to decide the preliminary mated possibility of every point of Pattern P and every point of Pattern Q according to some criteria so that, when a pair of points can not be mated, the device needs not to calculate the mated possibility of such pair and that the operation time may be reduced.

From equations (1), (2) and (3) we know, when a point pi from the test pattern P is mated with a point qj from the reference pattern Q, the following conditions shall be satisfied:

(a) Feature direction:

From equation (3) we have:

Dqj−Dpi=Dr+θ and

|Dqj−Dpi|<=|Dr|+|θ|.

Set a maximum tolerance for the difference of the feature direction DR and a maximum tolerance for the rotation angle θT, we then have:

$$|D_{qj} - D_{pi}| \leq DR + \theta T \quad (4)$$

In the coarse mating, if the difference of Dqj and Dpi is greater than (DR+θT), it can be decided that pi and qj are not mated.

(b) Shifting in the X direction:

From equation (1) we have:

$$x_{qj} - x_{pi} = tx + x_{pi}(\cos\theta - 1) - y_{pi}\sin\theta$$

$$|x_{qj} - x_{pi}| \leq |tx| + |x_{pi}(\cos\theta - 1) - y_{pi}\sin\theta|.$$

If TX is the maximum tolerance of shifting in the X direction, we have:

$$|x_{qj} - x_{pi}| \leq TX \quad (5)$$

If the difference of $X_{qj}$ and $x_{pi}$ is greater than TX, it can be decided that pi and qj can not be mated.

(c) Shifting in the Y direction:

From equation (2) we have:

$$y_{qj} - y_{pi} = ty + x_{pi}\sin\theta + y_{pi}(\cos\theta - 1)$$

$$|y_{qj} - y_{pi}| \leq |ty| + |x_{pi}\sin\theta + y_{pi}(\cos\theta - 1)|$$

If TY is the maximum tolerance for shifting in the Y direction, we have:

$$|y_{qj} - y_{pi}| \leq TY \quad (6)$$

When the difference of $y_{qj}$ and $y_{pi}$ is greater than TY, it can be decided that pi and qj can not be mated.

Let $S^{(o)}(pi, qj)$ be the initial mating possibility of pi and qj. If pi and qj can not be mated, let $S^{(o)}(pi, qj)=0$; Otherwise, let $S^{(o)}(pi, qj)=1$. In other words, when the conditions of equations (4), (5) and (6) are satisfied, $S^{(o)}(pi, qj)=1$; Otherwise, $S^{(o)}(pi, qj)=0$. This process can be called "coarse mating".

CALCULATION OF MATING POSSIBILITY

In the previous process, the initial mating possibility of every point of Pattern P and every point of Pattern Q is set to be 0 or 1. At 103 the initial mating possibility is then adjusted by the mated possibility calculation means 3, according to a new "fuzzy relaxation" approach. In the fuzzy relaxation approach, the mated possibility of one point pi from Pattern P and one point qj from Pattern Q is decided according to "the value of other mated pairs (ph and qk, h≠i, k≠j) to support such mating, given that pi and qj are mated". In the fuzzy relaxation as disclosed in this invention, the mated possibility of one point from Pattern P and one point from Pattern Q is calculated as follows:

Supposing the mating possibility of pi and qj is $S^{(r)}(pi, qj)$, when it is adjusted for the $r^{th}$ time and $S^{(o)}(pi, qj)$ is the initial mating possibility (0 or 1), $S^{(r)}(pi, qj)$ can be expressed as follows:

$$S^{(r)}(p_i, q_j) = \frac{1}{m-1} \sum_{\substack{h \neq i}}^{m} \left\{ \max_{k \neq j}^{n} [S^{(r-1)}(p_i, q_j) \times C_{ij}(h, k)] \right\} \quad (7)$$

In the above equation, pi represents a point from the test pattern P, qj represents a point from the reference pattern Q, $S^{(r)}(pi, qj)$ represents the mating possibility of points pi and qj when it is adjusted for the $r^{th}$ time wherein $S^{(o)}(pi, qj)$ is 0 or 1, m represents the least number of points in patterns P and Q, and Cij(h, k) represents the value that another mated pair consisting points ph and qk support the mating of pi and qj. In the embodiment of this invention, the supporting value Cij(h, k) can be interpreted as: The mating possibility of other pair of points ph and qk supposing points pi and qj are mated.

Although it is not intended to limit the scope of this invention, the "max" operation was adopted in the above equation because pi and qj are one-on-one corresponding; Only the maximum value of Cij(h, k) shall be considered where ph and qk could be mated.

In the equation, $$C_{ij}(h, k) = \frac{1}{1 + \Delta}, \text{ where} \quad (a)$$

-continued $$\Delta = \frac{w_l \cdot \Delta_l + w_\theta \cdot \Delta_\theta}{w_l + w_\theta} \text{ where} \tag{b}$$

$$\Delta_\theta = \frac{\Delta_s + \Delta_e}{2}, \tag{c}$$

$$\Delta s = \frac{D_s}{N_s}, \text{ if } Ds \leq Ns; \text{ Otherwise, } \Delta s = 1; \tag{d}$$

$$\Delta e = \frac{D_e}{N_e}, \text{ if } De \leq Ne; \text{ Otherwise, } \Delta e = 1; \text{ and} \tag{e}$$

$$\Delta l = \frac{d_l}{N_l}, \text{ if } d_l \leq N_l; \text{ Else, } \Delta_l = \Delta_s = \Delta_e = 1; \text{ wherein} \tag{f}$$

$$d_l = |\overline{p_i p_h} - \overline{q_j q_k}|; \tag{g}$$

$$D_s = |(D_{q_j} - \theta_{\overline{q_j q_k}}) - (D_{p_i} - \theta_{\overline{p_i p_h}})|; \text{ and} \tag{h}$$

$$D_e = |(D_{q_k} - \theta_{\overline{q_j q_k}}) - (D_{p_h} - \theta_{\overline{p_i p_h}})|; \text{ wherein} \tag{i}$$

$D_s$ represents the difference of feature directions of points pi and qj, $N_s$ is the maximum tolerance of the difference which normalizes $D_s$ to between 0 and 1; When $D_s$ is greater than $N_s$, $\Delta_s=1$ whereby $0 \leq \Delta_s \leq 1$;

$D_e$ represents the difference of feature directions of points ph and qk, $N_e$ is the maximum tolerance of the difference which normalizes $D_e$ to between 0 and 1; When $D_e$ is greater than $N_e$, $\Delta e=1$ whereby $0 \leq \Delta_e \leq 1$; and $d_l$ is the difference between $\overline{p_i p_h}$ and $\overline{q_j q_k}$, Nl is the maximum tolerance of the difference which normalizes $d_l$ to between 0 and 1; When $d_l$ is greater than Nl, $\Delta_e=1$ whereby $0 \leq \Delta_l \leq 1$. If the difference in distance $d_l$ is considered more important than the difference in distance $N_l$, in case $d_l$ is greater $N_l$, we set $\Delta_l = \Delta_s = \Delta_e = 1$.

In equation (c) $\Delta_\theta$ is the mean of $\Delta_s$ and $\Delta_e$. Thus, $0 \leq \Delta_\theta \leq 1$.

In equation (b) weights $w_l$ and $w_\theta$ are used to adjust the factors $\Delta_l$ and $\Delta_\theta$ to $\Delta$ and to normalize the differences to 0 and 1.

In equation (a) $\Delta$ is in reverse ratio with ($C_{ij}(h,k)$. Because $0 \leq \Delta \leq 1$, we have $0.5 \leq C_{ij}(h,k) \leq 1.0$. After being adjusted time and time, the mating possibility will be monotonously descending from 1 to 0. As a result, pairs of points that are mated will have higher mating possibilities and others will have mating possibilities tending toward 0.

From the above calculation, the mating possibility of every point from the test pattern with every point from the reference pattern can be obtained. This approach can also be called "fuzzy relaxation".

PRELIMINARY SELECTION OF MATED PAIRS

After the mating possibilities are adjusted repeatedly, the best mated pairs of points between patterns P and Q can be selected according to the values of the mating possibilities $S^{(r)}(pi, qj)$. Here the value of the mating possibilities is used as the criteria of selecting mated pairs. Thus, at 104 the selection means 4 conducts the selection of the best mated points according the value of $S^{(r)}(pi, qj)$.

Supposing S[pi][qj] is a matrix consisting of the mating possibilities S(pi, qj) for all points pi from pattern P and all points qj from pattern Q, after adjustment with fuzzy relaxation wherein i=1, 2, 3, . . . , m; j=1, 2, 3, . . . , n; wherein m represents the number of points in pattern P and n represents the number of points in pattern Q. Thus, the maximum number of mated pairs K can not be greater than m or n. That is, $k \leq \min(m,n)$ N pairs of points that have the greatest mating possibilities are selected from S[pi][qj] in sequence by the selection means 4, as follows:

At 104*a*, a matrix consisted of the mated possibilities of all points in Pattern P and Pattern Q is obtained. At 104*b* a k value (k=1) is set. At 104*c* a pair (pa and qb) with the greatest mating possibility (smax) is selected from S[i][j] and is considered amated pair, taking pa as op[k], qb as oq[k] and smax as sim[K].

At 104*d*, all elements in raw a and column b in matrix S[i][j] are labeled as 0. At 104*e* let k=k+1. At 104*f*, whether smax=0 is decided. If NO, go to step 104*c*; Otherwise, N pairs (N=k-1) are selected as mated pairs preliminarily.

FINE SELECTION OF MATED PAIRS

The pairs as selected from the previous process may include some pairs that shall not be mated, so far as matching of planar point patterns is concerned. In theory, those with higher mating possibilities shall be mated pairs. At 105, the adjustment means 5 uses N pairs of points with highest mated possibilities to find a geometric transformation (tx, ty, $\theta$) to adjust Pattern P. The geometric transformation is so decided that, after the "p" points of the N pairs are transformed, the sum of the square of the distances between "p" and "q" points of the N pairs is minimum. In other words, a geometric transformation (tx, ty, $\theta$) is found whereby E(tx, ty, $\theta$) has the minimum value wherein:

$$E(tx, ty, \theta) = \sum_{i=1}^{G} (x_{oq[i]} - x'_{op[i]})^2 + (y_{oq[i]} - y'_{op[i]})^2 \tag{8}$$

$$x'_{op[i]} = tx + x_{op[i]}\cos\theta - y_{op[i]}\sin\theta$$

$$y'_{op[i]} = ty + x_{op[i]}\sin\theta + y_{op[i]}\cos\theta$$

wherein ty and ty represent shifting in the X and Y directions, $\theta$ represents the angle of rotation, $x_{op}[i]$ and $y_{op}[i]$ represent the coordination of point p and $x''_{op}[i]$ and $y''_{op}[i]$ represent the coordination of point p, as transformed.

While the p points of the N pairs are transformed (shifted and rotated) with (tx,ty, $\theta$), the sum of the square distance between p points and q points of the N pairs are calculated at 106 by the adjustment means 5. If the sum is smaller than a threshold $d_1$, the pair is considered reserved; Otherwise, it is considered not mated and is deleted.

Supposing, after the selection, M pairs are reserved, a geometric transformation (tx,ty, $\theta$) is found again at 107 by the adjustment means 5. That is, to find a geometric transformation (tx,ty, $\theta$) whereby a minimum value of E(tx, ty, $\theta$) is obtained wherein:

$$E(tx, ty, \theta) = \sum_{i=1}^{M} (x_{oq[i]} - x'_{op[i]})^2 + (y_{oq[i]} - y'_{op[i]})^2 \tag{9}$$

$$x'_{op[i]} = tx + x_{op[i]}\cos\theta - y_{op[i]}\sin\theta$$

$$y'_{op[i]} = ty + x_{op[i]}\sin\theta + y_{op[i]}\cos\theta$$

While the "p" points of the M pairs are transformed with (tx,ty, $\theta$), the sum of the distance between p points and q points of the M pairs are calculated at 108 by the adjustment means 5. If the sum is smaller than a threshold $d_2$, the pair is reserved; Otherwise, it is considered not mated and is deleted. Here, $d_2 <= d_1$.

After two times of selection, K pairs are obtained. At 109 the average distance of the K pairs is labeled as diff and the average mated rate of patterns P and Q is labeled as md.

CALCULATION OF SIMILARITY OF TWO PATTERNS

From the previous process, the number of points of the patterns (n and m), the mating possibility of each mated pair S[i][j] and the coordinates of the mated points (px', py') and (qx, qy) can be obtained. At 110 the similarity calculation means 6 calculates some factors that can be used to calculate the similarity of the patterns based on these information. They are: number of mated pairs K, mated rate of the reference pattern S1, mated rate of the test pattern S2, average mating possibility md and average distance of mated points S3. With these factors, it is possible to calculate the similarity of the two patterns. At 111 the similarity calculation means 6 uses these factors to calculate the similarity of the patterns. The index of similarity can be expressed as Score wherein higher Score means higher similarity and lower Score means lower similarity.

The definitions of the five factors are as follows:

(1) Number of mated pairs, K: The result of the fine selection.

(2) Mated rate of the reference pattern, S1: S1=K/n.

(3) Mated rate of the test pattern, S2: S2=K/m.

(4) Average mated rate, md:

$$md = \frac{1}{K} \sum_{i=1}^{K} sim[i] \tag{10}$$

(5) Average distance of mated points, S3: S3=1.0/(1.0+diff)

The 1.0 in the denominator is added to prevent the denominator to be 0.

The above five factors are all in direct ratio with Score. The Score is thus defined as follows:

$$Score = C \cdot K^2 \cdot S_1^2 \cdot S_2 \cdot S_3^2 \cdot md \tag{11}$$

wherein C is a constant. Some factors are emphasized with square operations.

DETERMINATION

Finally, at 112 the determination means 7 uses a threshold to decide whether the patterns are similar. In other words, if the Score is greater than a threshold, the patterns are considered similar; Otherwise they are considered not similar.

EMBODIMENTS

The followings serve to be descriptions to an embodiment of the automatic matching device and method for planar point patterns, of this invention.

FIGS. 3(*a*), 3(*b*), 4(*a*), 4(*b*), 5(*a*), and 5(*b*) illustrate three patterns (Pattern A, Pattern B and Pattern C) consisting of 8 planar points. The coordinates and feature directions of the points are listed in the tables. Among the patterns, Pattern B (FIG. 4(*b*)) is similar to Pattern A (FIG. 3(*b*)), after shifting and rotation and Pattern C (FIG. 5(*b*)) and Pattern A (FIG. 3(*b*)) are not similar. Here, Pattern represents the reference pattern and Patterns B and C are test patterns to be matched.

COARSE MATING

In this embodiment, TX is set at 50, TY at 50 and (DR+θT) at 60 degrees.

A. Mating of Pattern B and Pattern A:

Mating of points a1 and b1 is taken as an example of the mating of mated pairs in Patterns B and A. From FIGS. 3(*a*), and 4(*a*), we have: a1=(24, 48, 0) and b1=(33, 36, 20).

(a) Feature direction: |Da1−Db1|=|0−20|=20<=60. The condition is satisfied.

(b) Shifting in the X direction: |X$_{a1}$−x$_{b1}$|=|24−33|=9≦50. The condition is satisfied.

(c) Shifting in the Y direction: |y$_{a1}$−y$_{b1}$|=|48−36|=12≦50. The condition is satisfied.

Since the three conditions are satisfied, let S[b1][a1]=1.

Mating of points a1 and b3 is taken as an example of the mating of non-mated pairs in Patterns B and A. From FIGS. 3(*a*) and 4(*a*) we have: a1=(24, 48, 0) and b3=(76,53,65).

(a) Feature direction: |Da1−Db3|=|0−65|=65>60. The condition is not satisfied.

(b) Shifting in X direction: |x$_{a1}$−x$_{b3}$|=|24−76|=52>50. The condition is not satisfied.

(c) Shifting in Y direction: |y$_{a1}$−y$_{b3}$|=|48−53|=5≦50. The condition is satisfied.

Since at least one condition is not satisfied, let S[b1][a1]=0.

The mating of other points are similar to the above and the description is thus omitted. The results of the coarse mating of Patterns B and A are illustrated in FIG. 6.

B. Mating of Pattern C and Pattern A:

Same processes are adopted in the coarse mating of Patterns C (FIG. 5(*b*) and A (FIG. 3(*b*)). FIG. 7 illustrates the results of coarse mating of Patterns C and A.

After the coarse mating, at least a half of the pairs that are not mated are identified.

FUZZY RELAXATION

In this embodiment, N$_s$ is set at 45 degrees, N$_e$ at 45 degrees, N$_l$ at 10, w$_l$ at 1, w$_\theta$ at 1. The mating possibilities are adjusted twice; r=2.

A. Mating of Pattern B and Pattern A:

Supposing b1 and a1 are mated, the mated possibility of b2 and a2 C$_{11}$(2,2) is calculated, as follows:

$$dl = |\overline{a_1 a_2} - \overline{b_1 b_2}| = |24 - 23| = 1 \le N_l = 10.$$

Thus, $\Delta_l = d_l / N_l = 1/10 = 0.1.$ $$D_s = |(D_{a_1} - \theta_{\overline{a_1 a_2}}) - (D_{b_1} - \theta_{\overline{b_1 b_2}})| = 2 \le N_s = 45.$$

Thus, $\Delta_s = D_s / N_s = 2/45 = 0.0444.$ $$D_e = |(D_{a_2} - \theta_{\overline{a_1 a_2}}) - (D_{b_2} - \theta_{\overline{b_1 b_2}})| = 2 \le N_e = 45.$$

Thus, $\Delta_e = D_e / N_e = 2/45 = 0.0444.$ $$\Delta_\theta = \frac{\Delta_s + \Delta_e}{2} = 0.0444.$$

$$\Delta = \frac{w_l \cdot \Delta_l + w_\theta \cdot \Delta_\theta}{w_l + w_\theta} = \frac{\Delta_l + \Delta_\theta}{2} = 0.0722.$$

So that:

$$C_{11}(2, 2) = \frac{1}{1 + \Delta} = 0.933.$$

Under same condition, the mated possibility of b2 and a3 C$_{11}$(2,3) is calculated. The result is 0.5. The mated possibilities of other pairs C$_{ij}$(h,k) are calculated, wherein i=1, j=1, h=2, ..., 8 and k=2, ..., 8. FIG. 8 illustrates the mated possibilities of pairs other than a1 and b1, supposing a1 and b1 are mated. Based on these data, the mated possibility of a1 and b1 can be adjusted according to equation (7). After two times of adjustments the result comes out to be 0.714. FIG. 9 illustrates the mated possibilities of every point in Pattern A and every point in Pattern B, after two times of adjustments.

B. Mating of Pattern C and Pattern A.

Mating of Patterns C and A is conducted in a similar way. FIG. 10 illustrates the mated possibilities of every point in Pattern A and every point in Pattern C, after two times of adjustments.

PRELIMINARY SELECTION OF MATED PAIRS

N pairs of mated pairs are selected according to the mated possibilities. For those can not be mated, the mated possibilities are replaced by 0.

A. Mating of Pattern B and Pattern A.

8 Pairs of mated points are selected according to their mated possibilities (N=8):

B1 and a1 are mated wherein op[1]=b1, oq[1]=a1 and sim[1]=0.714. The mated possibilities located in raw 1 and column 1 are replaced by 0.

B2 and a2 are mated wherein op[2]=b2, oq[2]=a2 and sim[2]=0.670. The mated possibilities located in raw 2 and column 2 are replaced by 0.

B3 and a3 are mated wherein op[3]=b3, oq[3]=a3 and sim[3]=0.617. The mated possibilities located in raw 3 and column 3 are replaced by 0.

B4 and a4 are mated wherein op[4]=b1, oq[4]=a4 and sim[4]=0.601. The mated possibilities located in raw 4 and column 4 are replaced by 0.

B5 and a5 are mated wherein op[5]=b5, oq[5]=a5 and sim[5]=0.567. The mated possibilities located in raw 5 and column 5 are replaced by 0.

B7 and a7 are mated wherein op[6]=b7, oq[6]=a7 and sim[6]=0.547. The mated possibilities located in raw 7 and column 7 are replaced by 0.

B7 and a7 are mated wherein op[7]=b6, oq[7]=a6 and sim[7]=0.547. The mated possibilities located in raw 6 and column 6 are replaced by 0.

B8 and a8 are mated wherein op[8]=b8, oq[8]=a8 and sim[8]=0.529. The mated possibilities located in raw 8 and column 8 are replaced by 0.

FIG. 11 illustrates the results of the preliminary selection of Patterns B and A.

B. Mating of Pattern C and Pattern A.

6 Pairs of mated points are selected according to their mated possibilities (N=6):

C8 and a8 are mated wherein op[1]=c8, oq[1]=a8 and sim[1]=0.383. The mated possibilities located in raw 8 and column 8 are replaced by 0.

C4 and a5 are mated wherein op[1]=c4, oq[1]=a5 and sim[1]=0.378. The mated possibilities located in raw 5 and column 4 are replaced by 0.

C5 and a4 are mated wherein op[1]=c5, oq[1]=a4 and sim[1]=0.370. The mated possibilities located in raw 4 and column 5 are replaced by 0.

C3 and a1 are mated wherein op[1]=c3, oq[1]=a1 and sim[1]=0.364. The mated possibilities located in raw 1 and column 3 are replaced by 0.

C6 and a7 are mated wherein op[1]=c6, oq[1]=a7 and sim[1]=0.350. The mated possibilities located in raw 7 and column 6 are replaced by 0.

C2 and a2 are mated wherein op[1]=c2, oq[1]=a2 and sim[1]=0.321. The mated possibilities located in raw 2 and column 2 are replaced by 0.

FIG. 12 illustrates the results of the preliminary selection of Patterns C and A.

FINE SELECTION OF MATED PAIRS

In this embodiment, d1 is set at 225, d2 at 150 and G at 4.

A. Mating of Pattern B and Pattern A.

Four mated pairs are selected to calculate the geometric transformation (tx, ty, θ) whereby the minimum value of E(tx, ty, θ) is obtained. The result comes out as (tx,ty, θ)=(−19.92, 27.54, −22.5 degrees). The transformation is used to transform the coordinates of points in Pattern B. FIG. 13 illustrates the coordinates of Pattern B after the transformation and the distance between the mated points.

Among the mated pairs, 8 pairs are with distances less than d1 (=255). Thus M=8.

The eight pairs are used to calculate the second transformation. We then have: (tx,ty, θ)=(−19.93,26.68, −21.3 degrees). Pattern B is transformed again. FIG. 14 illustrates the coordinates of Pattern B after the second transformation and the distance between the mated points.

Among the mated pairs, 8 pairs are with distances less than d2 (=150). Thus K=8. Now we have: diff=1.71 and md=2.398.

B. Mating of Pattern C and Pattern A.

Four mated pairs are selected to calculate the geometric transformation (tx, ty, θ) whereby the minimum value of E(tx, ty, θ) is obtained. The result comes out as (tx,ty, θ)=(−8.74, −0.20, 6.48 degrees). The transformation is used to transform the coordinates of points in Pattern C. FIG. 15 illustrates the coordinations of Pattern C after the transformation and the distance between the mated points.

Among the mated pairs, 4 pairs are with distances less than d1 (=255). Thus M=4.

The four pairs are used to calculate the second transformation. We then have: (tx,ty, θ)=(−23.12, 9.24, −0.93 degrees). Pattern C is transformed again. FIG. 16 illustrates the coordinates of Pattern C after the second transformation and the distance between the mated points.

Among the mated pairs, 4 pairs are with distances less than d2 (=150). Thus K=4. Now we have: diff=11.68 and md=0.369.

MATCHING OF PATTERNS

In this embodiment, C is set at 10000.0.

A. Matching of Pattern B and Pattern A.

K=8,

S1=K/n=8/8=1,

S2=K/m=8/8=1, md=0.598957, and

S3=1/(1+diff)=0.368846. Thus,

Score=$C \cdot K^2 \cdot S_1^2 \cdot S_2 \cdot S_3^2 \cdot md = 52151.48$.

B. Matching of Pattern C and Pattern A.

K=4,

S1=K/n=4/8=0.5,

S2=K/m=4/8=0.5, md=0.368672, and

S3=1/(1+diff)=0.226394. Thus,

Score=$C \cdot K^2 \cdot S_1^2 \cdot S_2 \cdot S_3^2 \cdot md = 377.92$.

DETERMINATION

In this embodiment the threshold to determine whether two patterns are similar is set at 5,000.0. While the similarity between Pattern B and Pattern A is 52,151.48, Pattern B and Pattern A are considered similar. While the similarity between Pattern C and Pattern A is 377.92, Pattern C and Pattern A are considered not similar.

EFFECTS OF THE INVENTION

In order to prove the effects of this invention, 800 fingerprints are matched in a personal computer adopting the invented method and in a personal computer adopting the method disclosed in Taiwan patent application No. 79109743.

20 Fingerprints are input for one finger for up to 40 different fingers and totally 800 fingerprints are obtained. The coordinates and feature directions of the feature points (the end points and the cross points) are abstracted with the conventional art.

Every pattern obtained from a finger is matched with the other 19 patterns from same finger. Because there are 40 fingers, the number of matching is: 40* (20*19)=15,200 times. The Scores are recorded.

Every pattern obtained from a finger is matched with patterns from other fingers. The number of matching is: 800*780=624,000 times.

In total the number of matching is: 624,000+15,200=639,200 times.

Figures 17A, 17B:
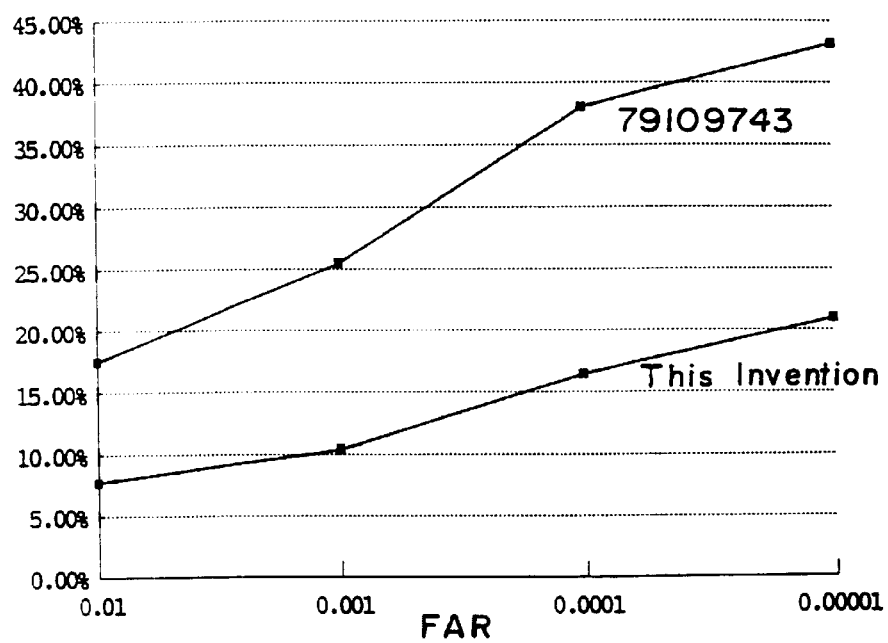
FIGS. 17(*a*) and 17(*b*) illustrates the results of the matching of patterns of 800 fingerprints obtained from 40 fingers, as processed by the method of this invention and the method of the conventional art.

FIGS. 17(a) and (b) illustrates the results of the matching of patterns of 800 fingerprints obtained from 40 fingers, as processed by the method of this invention and the method of the conventional art. As the table shows, the FRR of this invention is higher than the prior art for at least two times.

As the preferred embodiments of the present invention have been shown and described, various modifications and improvements thereon will become readily apparent to those skilled in the art. Accordingly, the spirit and scope of the present invention is to be limited only by the appended claims, and not by the foregoing disclosure.

What is claimed is:

1. A method for automatic matching of planar point patterns to decide whether two patterns (P and Q) consisting of points distributed in respective coordinate plans are similar;

wherein P={p1,p2, . . . pm} is a reference pattern including m points and Q={q1,q2, . . . qn} is a test pattern including n points and wherein every point of the pattern is expressed by (x,y,D) wherein (x, y) is the coordinate of the point and D is the feature direction of the point;

said method comprising:

a mating process to locate an only point pi in the P pattern for every point qj in the Q pattern thereby pi and qj are overlapped or within a very short distance from each other, if they were in a same coordinate plan;

a similarity index calculation process to calculate the similarity of the two patterns according to the result of said mating process; and a determination process to determine whether the two patterns are similar by comparing the index of similarity with a threshold;

wherein said mating process comprises:

calculating the mated possibility of every point in the Q pattern (qj, j=1, 2, . . . , m) and every point in the P pattern (pi, i=1, 2, . . . , n), comprising:

designating a point in the Q pattern (qj) to be mated with a point in the P pattern (pi);

calculating the mated possibility of every point, other than said qj point, in the Q pattern (qk, k=1, 2, . . . , m. k≠j) to be mated with every point, other than said pi point, in the P pattern (ph, h=1, 2, . . . , m, h≠i), under a transformation angle;

accumulating the mated possibilities of qk points and every ph points; and taking the result as the mated possibility of qj and pi; and selecting the mated parts according to the values of mated possibility of qj points and pi points;

wherein the mated possibility of qj and pi, (S(pi, qj)) is calculated according to the following equation:

$$S(pi, qj) = \frac{1}{m-1} \sum_{\substack{h \neq i}}^{m} \left\{ \max_{\substack{k \neq j}}^{n} [Cij(h, k)] \right\}$$

wherein $$Cij(h, k) = \frac{1}{1 + \Delta}$$

wherein $C_{ij}(h, k)$ represents the mated possibility of qk (k=1, 2, . . . , m, k≠j) and ph (h=1, 2, . . . , n h≠i), and $$\Delta = \frac{wl * \Delta l + w\theta * \Delta \theta}{wl + w\theta}$$

wherein $$\Delta \theta = \frac{\Delta s + \Delta e}{2},$$

Δs represents the difference between the difference between the feature direction of pi and the direction of $\overline{piph}$ and the difference between the feature direction of qj and the direction of $\overline{qiqk}$, Δe represents the difference between the difference between the feature direction of ph and the direction of $\overline{piph}$ and the difference between the feature direction of qk and the direction of $\overline{qiqk}$, Δ1 represents the difference between the lengths of $\overline{piph}$ and $\overline{qiqh}$, and w1 and wθ are constants; and wherein the similarity index (Score) of the two patterns is calculated according to the following equation:

Score=C*K$^2$*S$_1$$^2$*S$_2$*S$_3$$^2$*md, wherein

C is a constant;
K is the number of mated pairs;
S1 is the mated rate of the reference pattern, K/n;
S2 is the mated rate of the test pattern, K/m;
md is the average mated possibility of all the mated pairs; and
S3=1.0/(1.0+average distance of the mated points).

wherein the planar point patterns are automatically matched based upon said similarity value (Score) of the two patterns.

2. The method according to claim 1 wherein said reference pattern and said test pattern are abstracted from a planar image date file and are the terminal points or cross points of lines or curves in said planar image; wherein said feature direction represents the tangent direction of said line or curve while the corresponding point is a terminal point and represents the bisector direction of said line or curve while the corresponding point is a cross point; and wherein said feature direction is expressed by the angle from the horizontal direction.

3. The method according to claim 1 or 2 further comprising a coarse mating process before the mating process wherein said coarse mating process comprises:

setting a maximum tolerance for the differences in the feature directions and distances between points to be mated supposing said points are in a same coordinate plan; and determining a pair of points belonging to different patterns not mated if the difference of their feature directions or the distance between the points exceeds said maximum tolerance.

4. The method according to claim 1, further comprising an adjustment process after said mating process, comprising:

obtaining a transformation (tx,ty, θ) such that function E(tx,ty,θ) has the least value;

transforming said test pattern with said transformation; and mating the pattern according to the result of said transformation;

wherein:

$x_{qj} = tx + x_{pi} \cos\theta - y_{pi} \sin\theta$, $y_{qj} = tx + x_{pi} \sin\theta - y_{pi} \cos\theta$, and $D_{qj} = (D_{pi} + Dr) + \theta$;

wherein $(x_{pi}, y_{pi})$ and $(x_{qj}, y_{qj})$ represent coordinates of pi and qj, $D_{pi}$ and $D_{qj}$ represent the feature directions of pi and qj respectively, and Dr is the difference between the feature directions of pi and qj after the transformation; and $$E(tx, ty, \theta) = \sum_{i=1}^{G} (x_{oq[i]} - x'_{op[i]})^2 + (Y_{oq[i]} - y'_{op[i]})^2$$

wherein $x'_{op[i]} = tx + x_{op[i]} \cos\theta - y_{op[i]} \sin\theta$ represents the x coordinate of op[i] being transformed by E(tx,ty,θ); and $y'_{op[i]} = tx + x_{op[i]} \sin\theta + y_{op[i]} \cos\theta$ represents the y coordinate of op[i] being transformed by E(tx, ty,θ); and op[i] represents the G reference pattern points belonging to mated pairs with the highest mating possibilities; and G is a predetermined value greater than or equal to 4.

5. The method according to claim 4 wherein said adjustment process is applied to the G pairs of points and wherein pairs of points with distances exceeding a decided value are determined not mated.

6. The method according to claim 4 wherein the adjustment process is operated at least two times.

7. The method according to claim 5 wherein the adjustment process is operated at least two times.

8. The method according to claim 3 wherein said mating process further comprises repeated adjustments of the mated possibilities of pi points and qj points according to the following equation:

$$S^{(r)}(pi, qj) = \frac{1}{m-1} \sum_{h \neq i}^{m} \left\{ \max_{k \neq j}^{n} [S^{(r-1)}(pi, qj) \times Cij(h, k)] \right\} \text{ wherein}$$

$S^{(r)}$(pi, qj) represents the mated possibilities of pi points and qj points at the $r^{th}$ time of adjustment wherein $S^{(0)}$(pi, qj) is 0, if the result of the coarse mating shows a pi point and a qj point is not mated; otherwise, is 1.

9. A device for automatic matching of planar point patterns to decide whether two patterns (P and Q) consisting of points distributed in respective coordinate plans are similar;

wherein P={p1,p2, . . . pm} is a reference pattern including m points and Q={q1,q2, . . . qn} is a test pattern including n points and wherein every point of the pattern is expressed by (x,y,D) wherein (x, y) is the coordinate of the point and D is the feature direction of the point;

said device comprising:

a sample device to obtain samples of planar point patterns to be matched;

a mating device to locate an only point (pi) in the P pattern for every point (qj) in the Q pattern thereby pi and qj are overlapped or within a very short distance from each other, if they were in a same coordinate plan;

a similarity index calculation device to calculate the similarity of the two patterns according to the result of said mating process; and a determination device to determine whether the two patterns are similar by comparing the index of similarity with a threshold;

wherein mating of said mating device comprises:

calculating the mated possibility of every point in the Q pattern (qj, j=1, 2, . . . , m) and every point in the P pattern (pi, i=1, 2, . . . , n), by:

designating a point in the Q pattern (qj) to be mated with a point in the P pattern (pi);

calculating the mated possibility of every point, other than said qj point, in the Q pattern (qk, k=1, 2, . . . , m, k≠j) to be mated with every point, other than said pi point, in the P pattern (ph, h=1, 2, . . . , m, h≠i), under a transformation angle;

accumulating the mated possibility of every qk point and every ph point; and taking the result as the mated possibility of qj and pi; and selecting the mated parts according to the values of mated possibility of qj points and pi points;

wherein said mating device calculates the mated possibility of qj and pi, (S(pi, qj)), with the following equation:

$$S(pi, qj) = \frac{1}{m-1} \sum_{h \neq i}^{m} \left\{ \max_{k \neq j}^{n} [Cij(h, k)] \right\}$$

wherein $$Cij(h, k) = \frac{1}{1 + \Delta}$$

wherein $C_{ij}$(h, k) represents the mated possibility of qk (k=1, 2, . . . , m, k≠j) and ph (h=1, 2, . . . , n h≠i), and $$\Delta = \frac{wl * \Delta l + w\theta * \Delta\theta}{wl + w\theta}$$

wherein $$\Delta\theta = \frac{\Delta s + \Delta e}{2},$$

Δs represents the difference between the difference between the feature direction of pi and the direction of $\overline{piph}$ and the difference between the feature direction of qj and the direction of $\overline{qiqk}$, Δe represents the difference between the difference between the feature direction of ph and the direction of $\overline{piph}$ and the difference between the feature direction of qk and the direction of $\overline{qiqk}$, Δ1 represents the difference between the lengths of $\overline{piph}$ and $\overline{qiqh}$, and w1 and wθ are constants; and wherein the similarity index calculation device calculates the similarity value (Score) of the two patterns is calculated according to the following equation:

Score=$C*K^2*S_1^2*S_2^2*S_3^2*md$, wherein

C is a constant;
K is the number of mated pairs;
S1 is the mated rate of the reference pattern, K/n;
S2 is the mated rate of the test pattern, K/m;
md is the average mated possibility of all the mated pairs; and
S3=1.0/(1.0+average distance of the mated points).
wherein the planar point patterns are automatically matched based upon said similarity value (Score) of the two patterns.

10. The device according to claim 9 wherein said reference pattern and said test pattern are abstracted from a planar image date file and are the terminal points or cross points of lines or curves in said planar image; wherein said feature direction represents the tangent direction of said line or curve while the corresponding point is a terminal point and represents the bisector direction of said line or curve while the corresponding point is a cross point; and wherein said feature direction is expressed by the angle from the horizontal direction.

11. The device according to claim 9 or 10 further comprising a coarse mating device to decide, before the mating of said mating device, whether a point of Pattern P and a point of Pattern Q are mated by:

setting a maximum tolerance for the differences in the feature directions and distances between points to be mated supposing said points are in a same coordinate plan; and determining a pair of points belonging to different patterns not mated if the difference of their feature directions or the distance between the points exceeds said maximum tolerance.

12. The device according to claim 9 or 10, further comprising an adjustment process to transform said pattern P after the mating of said mating device by:

obtaining a transformation (tx,ty, $\theta$) such that function E(tx,ty,$\theta$) has the least value;

transforming said test pattern with said transformation; and mating the pattern according to the result of said transformation;

wherein:

$x_{qj}=tx+x_{pi} \cos \theta - y_{pi} \sin \theta$, $Y_{qj}=tx+x_{pi} \sin \theta - y_{pi} \cos \theta$, and $D_{qj}=(D_{pi}+Dr)+\theta$;

wherein $(x_{pi}, y_{pi})$ and $(x_{qj}, y_{qj})$ represent coordinates of pi and qj, $D_{pi}$ and $D_{qj}$ represent the feature directions of pi and qj respectively, and Dr is the difference between the feature directions of pi and qj after the transformation; and $$E(tx, ty, \theta) = \sum_{i=1}^{G} (x_{oq[i]} - x'_{op[i]})^2 + (Y_{oq[i]} - y'_{op[i]})^2;$$

wherein $x'_{op[i]}=tx+x_{op[i]}\cos \theta - y_{op[i]}\sin \theta$ represents the x coordinate of op[i] being transformed by E(tx,ty,$\theta$);

$y'_{op[i]}=tx+x_{op[i]}\sin \theta + y_{op[i]}\cos \theta$ represents the y coordinate of op[i] being transformed by E(tx, ty,$\theta$); and op[i] represents the G reference pattern points belonging to mated pairs with the highest mating possibilities; and G is a predetermined value greater than or equal to 4.

13. The device according to claim 12 wherein said adjustment device is applied to the G pairs of points and wherein pairs of points with distances exceeding a decided value are determined not mated.

14. The device according to claim 12 wherein said adjustment device transforms said Pattern P for at least two times.

15. The device according to claim 13 wherein said adjustment device transforms said Pattern P for at least two times.

16. The device according to claim 11 wherein said mating device repeatedly adjusts the mated possibilities of pi points and qj points according to the following equation:

$$S^{(r)}(pi, qj) = \frac{1}{m-1} \sum_{h \neq i}^{m} \left\{ \max_{k \neq j}^{n} [S^{(r-1)}(pi, qj) \times Cij(h, k)] \right\} \text{ wherein}$$

$S^{(r)}(pi, qj)$ represents the mated possibilities of pi points and qj points at the $r^{th}$ time of adjustment wherein $S^{(0)}(pi, qj)$ is 0, if the result of the coarse mating shows a pi point and a qj point is not mated; otherwise, is 1.

\* \* \* \* \*